(12) United States Patent
Hammer et al.

(10) Patent No.: US 8,306,809 B2
(45) Date of Patent: Nov. 6, 2012

(54) SYSTEM AND METHOD FOR SUGGESTING RECIPIENTS IN ELECTRONIC MESSAGES

(75) Inventors: Mette Hammer, Dublin (IE); Gary Denner, Dublin (IE); Patrick O'Sullivan, Dublin (IE); Liam Harpur, Co. Dublin (IE); Christopher J. Boilard, Merrimack, NH (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 12/175,328

(22) Filed: Jul. 17, 2008

(65) Prior Publication Data
US 2010/0017194 A1    Jan. 21, 2010

(51) Int. Cl.
*G06F 17/27* (2006.01)
*G06F 15/16* (2006.01)

(52) U.S. Cl. ............................. 704/9; 709/206
(58) Field of Classification Search ........................ None
See application file for complete search history.

(56) References Cited

U.S. PATENT DOCUMENTS

| | | | |
|---|---|---|---|
| 5,119,318 A | | 6/1992 | Paradies et al. |
| 5,247,661 A | * | 9/1993 | Hager et al. ........................... 1/1 |
| 5,276,869 A | * | 1/1994 | Forrest et al. .................. 709/206 |
| 5,311,575 A | | 5/1994 | Oh |
| 5,752,194 A | | 5/1998 | Lin et al. |
| 5,802,278 A | | 9/1998 | Isfeld et al. |
| 5,828,835 A | | 10/1998 | Isfeld et al. |
| 5,835,084 A | | 11/1998 | Bailey et al. |
| 5,835,758 A | | 11/1998 | Nochur et al. |
| 5,940,823 A | | 8/1999 | Schreiber et al. |
| 5,970,491 A | | 10/1999 | Schreiber et al. |
| 5,974,415 A | | 10/1999 | Schreiber |
| 6,014,690 A | | 1/2000 | Van Doren et al. |
| 6,049,819 A | | 4/2000 | Buckle |
| 6,052,562 A | | 4/2000 | Dorenbosch |
| 6,094,686 A | | 7/2000 | Sharma |
| 6,108,752 A | | 8/2000 | Van Doren et al. |
| 6,144,727 A | | 11/2000 | Mashinsky |
| 6,154,783 A | * | 11/2000 | Gilmour et al. ................ 709/245 |
| 6,154,816 A | | 11/2000 | Steely et al. |
| 6,279,084 B1 | | 8/2001 | Van Doren et al. |
| 6,340,977 B1 | | 1/2002 | Lui et al. |
| 6,377,543 B1 | | 4/2002 | Grover et al. |

(Continued)

OTHER PUBLICATIONS

Kassoff et al., "Semantic Email Addressing: Sending Email to People, Not Strings", AAAI Fall Symposia, 2006.*

*Primary Examiner* — Brian Albertalli
(74) *Attorney, Agent, or Firm* — Jeffrey T. Holman (57) ABSTRACT

A system and method for dynamically recognizing a potential recipient of an electronic message. The method includes receiving content input for an electronic communication. The electronic communication includes at least one field of a plurality of fields, including a subject line, a message body, and a recipient address field. The at least one field of the electronic communication is populated with the content input. The method also includes parsing the content input of the at least one field of the electronic communication. The method also includes semantically analyzing the parsed content input of the at least one field of the electronic communication to identify a content qualifier of a recipient rule. The method also includes suggesting a potential recipient of the electronic communication based on the content qualifier of the recipient rule associated with the content input of the at least one of field of the electronic communication.

14 Claims, 8 Drawing Sheets

U.S. PATENT DOCUMENTS

| | | |
|---|---|---|
| 6,377,949 B1 * | 4/2002 | Gilmour ............................... 1/1 |
| 6,430,576 B1 | 8/2002 | Gates et al. |
| 6,463,345 B1 | 10/2002 | Peachey-Kountz et al. |
| 6,564,264 B1 * | 5/2003 | Creswell et al. .............. 709/245 |
| 6,604,141 B1 | 8/2003 | Ventura |
| 6,621,851 B1 | 9/2003 | Agee et al. |
| 6,651,111 B2 | 11/2003 | Sherman et al. |
| 6,691,156 B1 | 2/2004 | Drummond et al. |
| 6,718,368 B1 * | 4/2004 | Ayyadurai .................... 709/206 |
| 6,724,722 B1 | 4/2004 | Wang et al. |
| 6,792,448 B1 | 9/2004 | Smith |
| 6,829,607 B1 * | 12/2004 | Tafoya et al. ........................ 1/1 |
| 6,895,438 B1 | 5/2005 | Ulrich |
| 7,000,194 B1 | 2/2006 | Newbold |
| 7,016,937 B1 * | 3/2006 | Malik ........................... 709/206 |
| 7,043,698 B2 | 5/2006 | Newbold |
| 7,051,070 B2 | 5/2006 | Tuttle et al. |
| 7,110,975 B2 | 9/2006 | Marks de Chabris et al. |
| 7,114,004 B2 | 9/2006 | El-Gazzar et al. |
| 7,200,637 B2 | 4/2007 | Klos et al. |
| 7,206,805 B1 | 4/2007 | McLaughlin, Jr. |
| 7,225,405 B1 | 5/2007 | Barrus et al. |
| 7,233,803 B2 * | 6/2007 | Nielsen et al. ................ 455/466 |
| 7,272,634 B2 | 9/2007 | Clement et al. |
| 7,574,349 B2 * | 8/2009 | Perronnin ........................ 704/9 |
| 2005/0075880 A1 * | 4/2005 | Pickover et al. ............. 704/270 |
| 2007/0130368 A1 * | 6/2007 | Martin et al. ................. 709/245 |
| 2008/0071873 A1 * | 3/2008 | Gross ........................... 709/206 |
| 2008/0273220 A1 * | 11/2008 | Couchman .................. 358/1.15 |
| 2009/0037413 A1 * | 2/2009 | Castell et al. ..................... 707/7 |
| 2009/0077026 A1 * | 3/2009 | Yanagihara ...................... 707/3 |
| 2009/0234876 A1 * | 9/2009 | Schigel et al. ................ 707/102 |
| 2009/0300546 A1 * | 12/2009 | Kwok et al. .................. 715/825 |
| 2010/0017478 A1 * | 1/2010 | Mejia et al. .................. 709/206 |

* cited by examiner

SYSTEM AND METHOD FOR SUGGESTING RECIPIENTS IN ELECTRONIC MESSAGES

BACKGROUND

It can be difficult for an email user to remember to include all of the intended recipients for an email. As one example, an email user may add his or her direct supervisor as a recipient to the email, but may inadvertently forget to include another recipient such as a project manager. In many cases, these types of oversights are eventually discovered, resulting in additional emails being sent to the appropriate recipients. However, if this type of oversight is not discovered, an individual who should have received the communications may be uninformed about the content of the communication. In some cases such an oversight may result in missed meetings, missed deadlines, and missed opportunities. Such an oversight can be costly in time, productivity, and a company's bottom line, because an employee may waste time resending emails and fixing any consequential fallout from neglecting to include an overlooked recipient. In other cases, it may be detrimental for the person who did not receive the email to be uninformed about the content of the email.

Currently, the human memory and memory aids such as notes and reminders are used to remember who to include in a recipient list. As one example of a reminder, the email user may receive another email in response to the original email to suggest that the email user send the email to an additional recipient. The email user may then send a duplicate of the original email to the overlooked recipient. However, this solution, besides being a potential embarrassment to the email user, is an unproductive use of personnel resources not to mention a waste of system resources in using additional bandwidth and system storage to send the duplicate email. Moreover, the oversight may be overlooked until it is too late to remedy the oversight (e.g. has begun) a meeting invitation omission that is not recognized until the meeting has begun.

SUMMARY

Embodiments of an apparatus are described herein. In one embodiment, the apparatus is a potential recipient apparatus (PRA). An embodiment of the apparatus includes a receiver, a parser, a comparator, and a trigger. The receiver receives content input for an electronic communication. The electronic communication includes at least one field of a plurality of fields. The plurality of fields includes a subject line, a message body, and a recipient address field. The at least one field of the electronic communication is populated with the content input. The parser parses the content input of the electronic communication. The comparator semantically analyzes the parsed content input of the at least one field of the electronic communication for a content qualifier of a recipient rule. The trigger suggests a potential recipient of the electronic communication based on the content qualifier of the recipient rule associated with the content input of the at least one field of the electronic communication. Other embodiments of the apparatus are also described.

Embodiments of a method are also described. In one embodiment, the method is a method for dynamically recognizing a potential recipient of an electronic message. The method includes receiving content input for an electronic communication. The electronic communication includes at least one field of a plurality of fields. The plurality of fields includes a subject line, a message body, and a recipient address field. The at least one field of the electronic communication is populated with the content input. The method also includes parsing the content input of the at least one field of the electronic communication. The method also includes semantically analyzing the parsed content input of the at least one field of the electronic communication to identify a content qualifier of a recipient rule. The method also includes suggesting a potential recipient of the electronic communication based on the content qualifier of the recipient rule associated with the content input of the at least one of field of the electronic communication. Other embodiments of the method are also described.

Other aspects of embodiments of the apparatus and method will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate dynamically adding overlooked recipients to an address field of an electronic message such as an email according to a selection of a user. An exemplary electronic messaging system includes Lotus Notes®. This and other message servers serve a messaging service through a software application that may be stored and executed on a computer system.

Figure 1:
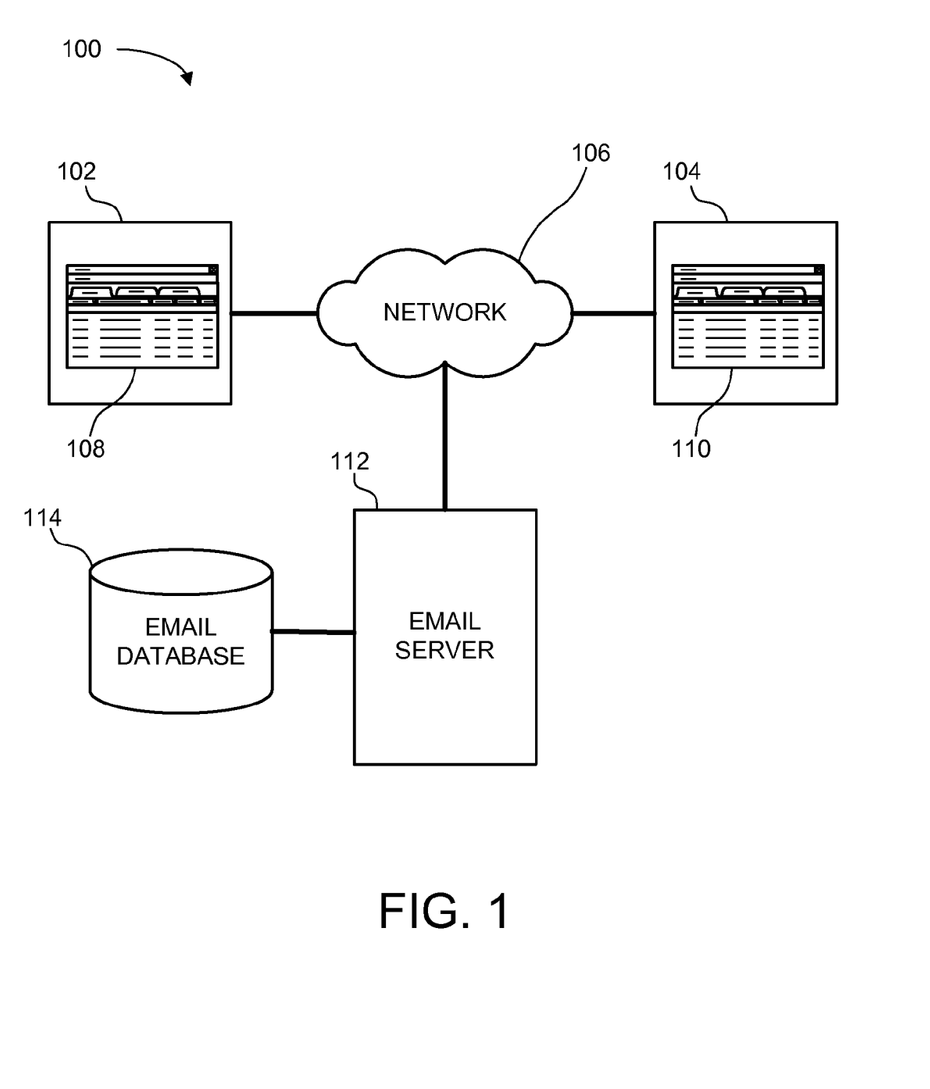
FIG. 1 depicts a schematic block diagram of one embodiment of an email system.

FIG. 1 depicts a schematic block diagram of one embodiment of an email system 100. The illustrated email system 100 includes multiple nodes 102 and 104 connected together via a computer communication network 106 such as an intranet or the internet. The nodes 102 and 104 are also referred to, in some instances, as client computers 102 and 104. Each of the nodes 102 and 104 may be referred to as a sending node and/or a receiving node, depending on the direction of data flow between the nodes 102 and 104 at any given time. It should also be noted that the email system 100 may include more than two nodes. Each node 102 and 104 implements an email client (represented by the depicted email user interfaces 108 and 110) so that an email session may be realized between the email clients.

Although the depicted nodes 102 and 104 include email clients 108 and 110, respectively, other embodiments of the nodes 102 and 104 may include fewer or more clients. Additionally, at least some of the resources of each client may be shared among multiple clients. For example, some embodiments of the nodes 102 and 104 store email messages and related messages and data on a single data repository (e.g., email database 114). As another example, the email messages and related messages and data of the nodes 102 and 104 may be stored on more than one data repository. Other configurations also may be implemented.

Figure 3:
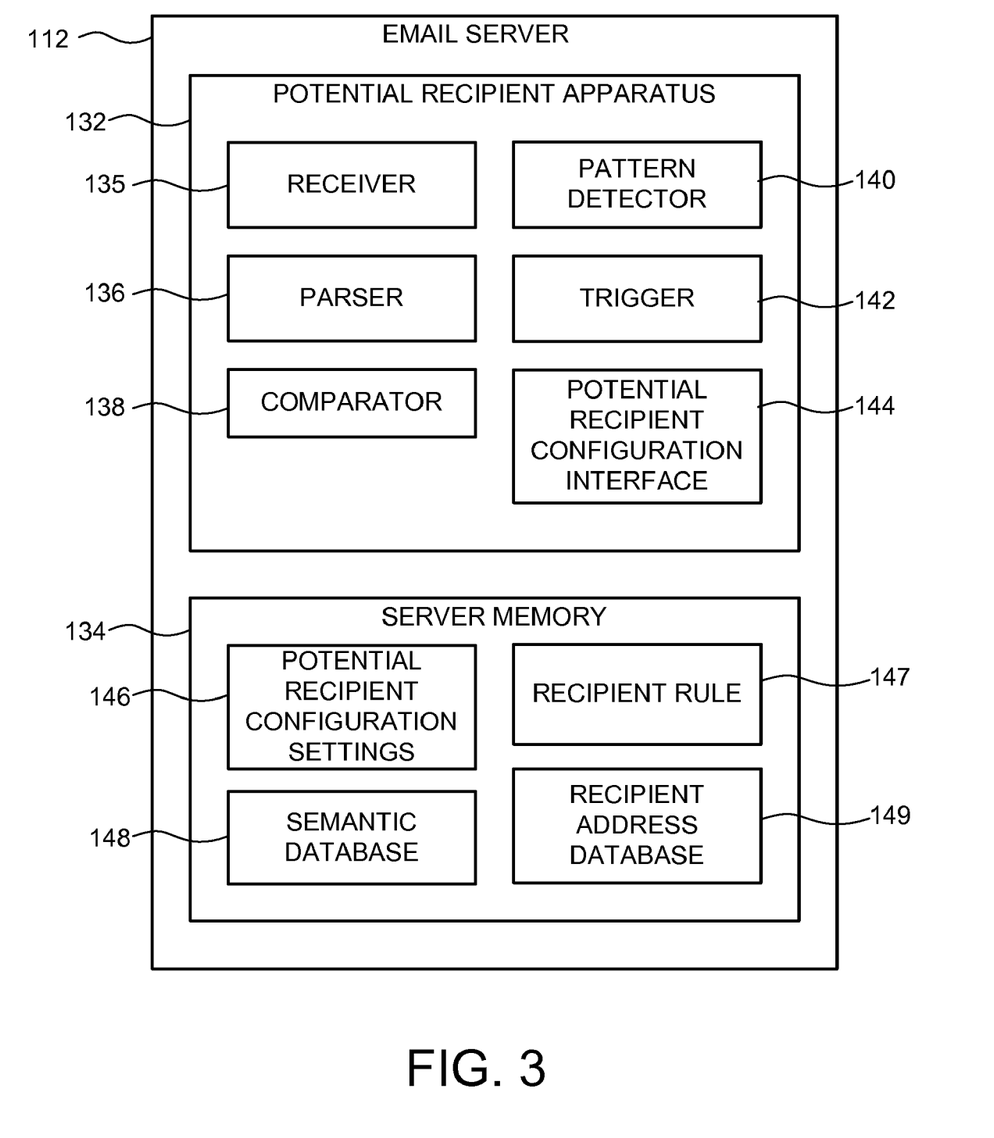
FIG. 3 depicts a schematic block diagram of one embodiment of the email server of the email system of FIG. 1.

The illustrated email system 100 also includes an email server 112 to facilitate the email session between the multiple nodes 102 and 104. One example of the email server 112 is shown in FIG. 3 and described in more detail below. Additionally, the email system 100 depicts an email database 114 connected to the email server 112. In some embodiments, the email server 112 facilitates an email session between the email clients on the various nodes 102 and 104. Additionally, where more than two nodes and email clients are present within the email system 100, the email server 112 may facilitate a single email session among more than two nodes, or multiple email sessions between the same or different nodes within the email system 100. It should be noted that the configurations of the nodes 102 and 104, the email clients, the email database 114, and the email server 112 are not limited to particular hardware or software implementations. For example, multiple email servers 112 may be present within the email system 100 to facilitate multiple simultaneous email sessions.

The email database 114 stores emails, and facilitates exchanging emails among a plurality of nodes 102 and 104 across the network 106. The network 106 may be an intranet, the internet, a local area network (LAN), a wide area network (WAN), a cellular network, or another type of network, or a combination of different types of networks. In one embodiment, the email database 114 facilitates local replication. In some embodiments, the email database 114 includes a local electronic memory device or a data storage device within a computer system. In one embodiment, the email database 114 includes an electronic memory device or a data storage device within an email server.

Figure 2:
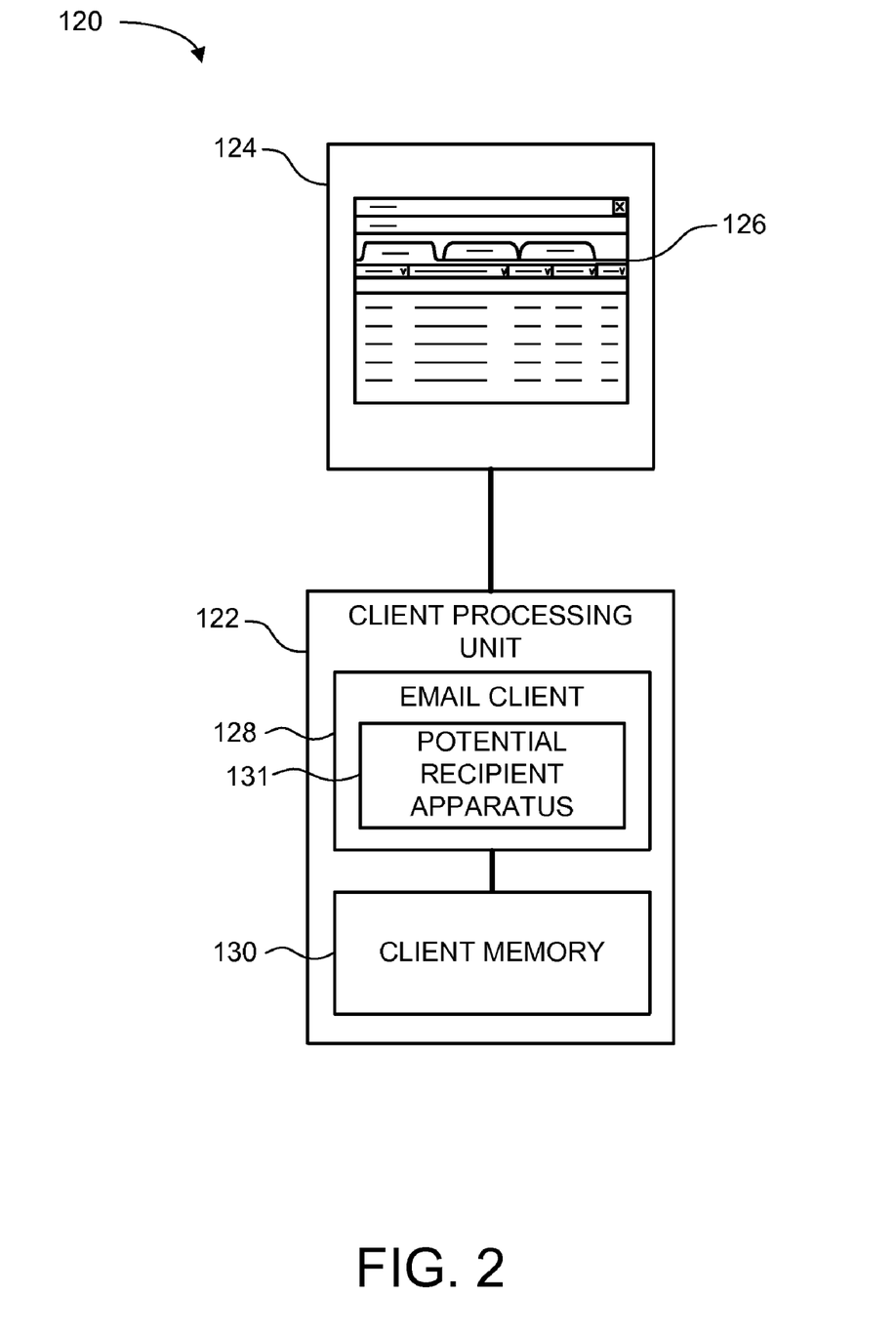
FIG. 2 depicts a schematic block diagram of one embodiment of a client computer of the email system of FIG. 1.

FIG. 2 depicts a schematic block diagram of one embodiment of a client computer 120 that is substantially similar to the nodes 102 and 104 of the email system 100 of FIG. 1. The illustrated client computer 120 includes a client processing unit 122 and a display device 124. In some embodiments, the display device 124 displays an email user interface 126, similar to the email user interfaces 108 and 110 described above. In some embodiments, the email user interface 126 allows a user to compose an email message and to configure options related to the functions of the email user interface 126. In some embodiments, the scheduling data includes such data as meeting times, meeting location, meeting topics, invited participants, etc.

The client processing unit 122 includes an email client 128 and a client memory 130. Additionally, in some embodiments, the email client 128 includes a potential recipient apparatus (PRA) 131. The email client 128 facilitates an email session on the client computer 120. As described above, the email server 112 facilitates several email sessions between the local and remote email clients. In some embodiments, at least a part of the email session 128 is stored in the client memory 130. In some embodiments, the local email client 128 is configured to aggregate both local related email data and remote related email data from the email server 112. In this way, a user may view an offline email session on the display device 124 related to the user's emails stored locally on the client memory 130 as well as any online email data stored on the email server 112 and/or the email database 114.

The client memory 130 is coupled to the email client 128. In some embodiments, the client memory 130 stores data related to an email session of the email client 128. Some embodiments of the client memory 130 also store other data in addition to data related to an email session. In some embodiments, the client memory 130 stores potential recipient data associated with the PRA 130. In some embodiments, the client memory 130 stores potential recipient configuration settings associated with functions of the PRA 131. In some embodiments, the email client 128 in conjunction with the client memory 130 allows a user to interface with a PRA 131 operated from the email server 112. One example of an implementation of the PRA 131 is shown in FIG. 3 and described in more detail below.

Figure 4:
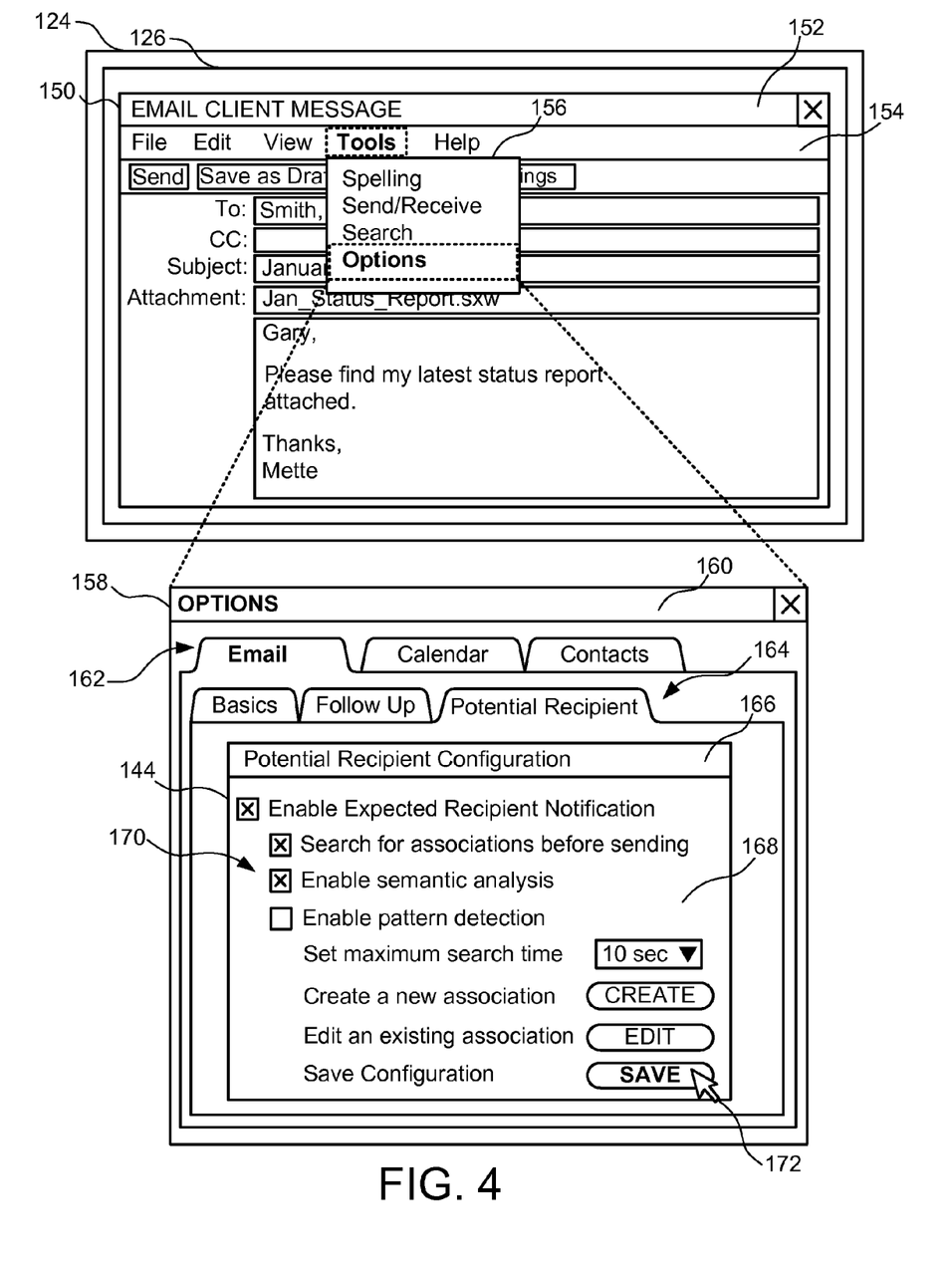
FIG. 4 depicts a schematic block diagram of one embodiment of a potential recipient configuration interface for use with the email server of FIG. 3.
Figure 6:
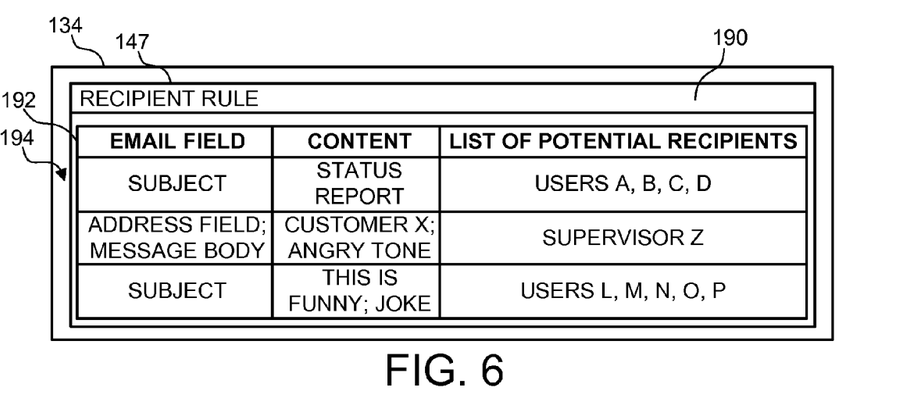
FIG. 6 depicts a schematic block diagram of one embodiment of potential recipient associations stored in the semantic database of FIG. 3.

FIG. 3 depicts a schematic block diagram of one embodiment of the email server 112 of the email system 100 of FIG. 1. The illustrated email server 112 includes a potential recipient apparatus (PRA) 132 and a server memory 134. In some embodiments, the PRA 132 of FIG. 3 is substantially similar to the PRA 131 of FIG. 2. Additionally, the PRA 132 includes a receiver 135, a parser 136, a comparator 138, a pattern detector 140, a trigger 142, and a potential recipient configuration interface 144. Additionally, the server memory 134 stores potential recipient configuration settings 146, a recipient rule 147, a semantic database 148, and a recipient address database 149. The potential recipient configuration settings 146 include configuration settings related to at least some of the functions of the PRA 132. One example of the potential recipient configuration settings 146 is shown in FIG. 4 and described in more detail below. The semantic database 148 stores meanings of content input of an electronic message. In some embodiments, the semantic database 148 contains associations between various text strings and the semantic, morphological and/or syntactical elements of those various text strings. Alternatively, in some embodiments, the semantic database 148 contains direct associations between various text strings related to the fields of an email and a list of suggested recipients of the email. One example of potential recipient associations is shown in FIG. 6 and described in more detail below.

Although the depicted email server 112 includes the PRA 132 and the server memory 134, other embodiments of the email server 112 may include fewer or more components. Additionally, at least some of the resources of the email server 112 may be shared among multiple servers. Additionally, at least some of the resources of the email server 112 may be shared among client computers such as the client computer 120 depicted in FIG. 2. For example, some embodiments of the potential recipient configuration settings 146 and/or the semantic database 148 are stored on a single server memory device 134. As another example, the potential recipient configuration settings 146 and/or the semantic database 148 may be stored on more than one memory device, including the client memory device 130 of the client computer 120. Other configurations may also be implemented.

The depicted PRA 132 facilitates dynamically adding overlooked recipients, or potential recipients, to an address field of an email such as an email based on a semantic parsing of at least one of several fields of the email. In one example embodiment, the fields of the email include a subject line, a message body, an attachment field, and an address field. Additionally, some embodiments may include fewer or more fields. In some embodiments, the PRA 132 queries the semantic database 148 for a stored meaning of content input of an electronic message.

In some embodiments, the email client 128 interfaces with the PRA 132 to allow a user to compose an email and to verify whether another user is overlooked as a recipient of the email. For example, the user may be asked by supervisor Z to send out a weekly status report to supervisor Z and project manager Y. If the user inadvertently leaves project manager Y off the list of potential recipients in the address field of the email, in some embodiments, the PRA 132 suggests project manager Y as a potential recipient for the user to add to the address field of the email according to the potential recipient configuration settings 146 and/or a semantic parsing of a field of the email.

In one embodiment, the receiver 135 receives content input for an electronic communication. The electronic communication includes at least one of several fields including a subject line, a message body, an attachment field, and an address field to include a recipient. In some embodiments, at least one of the fields of the electronic communication is populated with the content input In one embodiment, the parser 136 parses at least one of the fields of an email. In some embodiments, the parser 136 determines the meaning of a text string associated with a field of an email. The text string is sent from the client computer 120 over the network 106 to the email server 112. The form of the text string is one or more words in natural language. The parser 136 determines the meaning of the text string by applying semantic, morphological and/or syntactical principles to the text string.

In one embodiment, the comparator 138 compares the parsed fields of the email to associations in the semantic database 148. In some embodiments, the comparator 138 compares the text string of an email field to the semantic database 148 to derive a meaning from the text string in conjunction with the parser 136. In some embodiments, the comparator 138 compares the parsed text string to a predefined index of associations. In some embodiments, the comparator 138 compares the text string directly to the predefined index. In some embodiments, the comparator 138 compares the meaning of the text string derived by the parser 136 to a predefined index. As illustrated the server memory device 134 includes potential recipient configuration settings 146 and a semantic database 148. The semantic database 148 includes meanings of certain text strings. In other words, the semantic database 148 contains associations between various text strings and the semantic, morphological and/or syntactical elements of those various text strings. Additionally, the semantic database includes associations between the semantic, morphological and/or syntactical elements of those various text strings as they relate to one or more fields of the email and a list of potential recipients. In as much as the parser 136 is able to derive a meaning from a user entered text string, an association with the derived meaning may be found in the semantic database 148.

The depicted pattern detector 140 is coupled to the parser 136 and the comparator 138. The pattern detector 140, in one embodiment, queries the email database 114 for saved emails stored in the email database 114. Saved email may include saved drafts of emails, sent emails, and other similar emails. Alternatively, the pattern detector 140, in some embodiments, queries the client memory device 130 for saved emails stored in the client memory device 130. In some embodiments, the parser 136 in conjunction with the pattern detector 140 parses fields from the queried saved emails. In some embodiments, the comparator 138 is further configured to compare the parsed fields of one of the queried saved emails to at least one of the other of the queried and parsed saved emails. The pattern detector 140 then detects whether a pattern exists between recipients of the parsed saved emails and the parsed fields of the one of the compared saved emails. In some embodiments, the pattern detector 140 is further configured to store the detected pattern between recipients of the saved emails and the parsed fields of the one of the plurality of saved emails as a new recipient rule 147 in the memory device 134.

In an example embodiment, parser 136 may parse saved emails A, B, and C. Saved emails A and B may contain the text string "Status Report" in the subject line field of the emails while saved email C may contain the text string "Joke" in the subject line field. The comparator 138 compares the parsed fields of saved emails A, B, and C and the pattern detector 140 detects that a pattern exists between emails A and B while no pattern exists between A and C, or B and C. The pattern detector 140 then detects any common recipients of saved emails A and B. If the pattern detector 140 detects any common recipients of saved emails A and B, the pattern detector 140 stores the detected pattern as a new recipient rule 147 in the memory device 134, associating the subject line field of an email containing the text string "Status Report" with a list of potential recipients common to emails A and B.

The depicted trigger 142 operates in conjunction with the operations of the parser 136 and the comparator 138. In one embodiment, the trigger 142 is configured to determine that a match exists between at least one of the parsed fields of an email and at least one of the potential recipient associations stored in the semantic database 148. In some embodiments, the trigger 142 is further configured to determine that at least one of the recipients from a list of potential recipients from at least one of the potential recipient associations is not included in the address field of the email. In some embodiments, the trigger is further configured to generate a potential recipient notification in response to the determination that at least one of the recipients from the list of potential recipients is not included in the address field of the email. The trigger 142 then adds at least one of the recipients from the list of potential recipients to the address field of the email according to the selection of the user.

In one embodiment, the potential recipient configuration interface 144 is stored in the server memory device 134. In some embodiments, the potential recipient configuration interface 144 is stored at least partially on the client memory device 130. The potential recipient configuration interface 144 allows a user to configure potential recipient configuration settings 146 and to save the potential recipient configuration settings 146 in the server memory device 134. The potential recipient configuration settings 146 include a master enable option, a search before sending option, an enable semantic analysis option, an enable pattern detection option, a search time option, a create new potential recipient association option, an edit existing potential recipient association option, and a save configuration option. Some embodiments of the potential recipient configuration settings 146 contain fewer or more options.

FIG. 4 depicts a schematic block diagram of one embodiment of a potential recipient configuration interface 144 for use with the email server 112 of FIG. 3. In particular, the email client message 150 shows the potential recipient configuration interface 144 within a graphical user interface (GUI) for display on a display device 124. In some embodiments, the GUI includes the email client interface 126. It should be noted that other embodiments of the potential recipient configuration interface 144 may be integrated with existing or new interfaces that are used to display related information.

The illustrated email client message 150 includes a title bar 152, a menu bar 154, and an options drop down menu 156. The title bar 152 shows a title of the email client message 150. The menu bar 154 shows a possible menu selection within the email client message 150. The options drop down menu 156 is depicted as being accessible from a tools option from the menu bar 154. The illustrated email client message 150 also depicts an options window 158. The options window 158 is depicted as being accessible from the options drop down menu 156.

As depicted, the options window 158 includes a main tab bar 162, an email tab option 164, and a potential recipient configuration interface 144. Additionally, the potential recipient configuration interface 144, as depicted, includes a configuration title bar 166, a configuration viewing space 168, configuration options 170, and a mouse cursor 172. The configuration title bar 166 shows a title of the potential recipient configuration interface 144. The configuration viewing space 168 shows the configuration options 170 of the potential recipient configuration interface 144.

As depicted, the configuration options 170 include a master enable option to enable potential recipient notification, a search before sending option to search for potential recipients before sending a composed email, an enable semantic analysis option, an enable pattern detection option. Additionally, the configuration options 170, in some embodiments, include a search time option such as a maximum of 10 seconds to find potential recipients, a create new potential recipient association option that allows a user to create their own associations between text strings, semantics, etc. and a list of potential recipients, an edit existing potential recipient association option, and a save configuration option.

As depicted in FIG. 4, a user places the mouse cursor 172 to click on the save button of the configuration options 170. The potential recipient configuration settings 146 selected by the user are then saved in the server memory device 134. Thus, a user may configure a user profile of potential recipient associations according to the configuration options 170 selected by the user. In some embodiments, the profile of the user is saved in the server memory device 134. Alternatively, in some embodiments, the profile of the user is saved at least partially on the client memory device 130.

Figure 5:
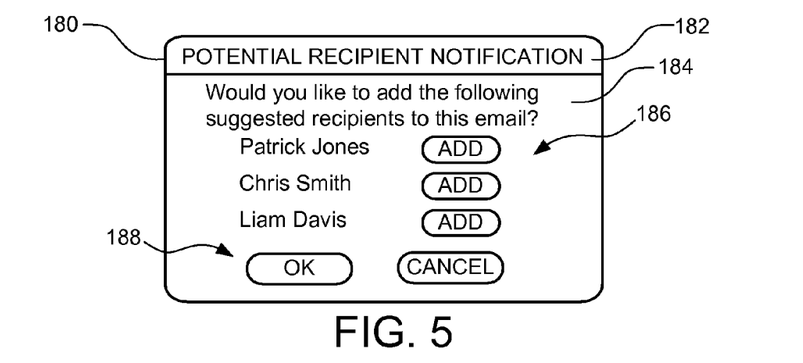
FIG. 5 depicts a schematic diagram of one embodiment of a potential recipient notification for use with the email server of FIG. 3.

FIG. 5 depicts a schematic diagram of one embodiment of a potential recipient notification 180 for use with the email server 112 of FIG. 3. In particular, the potential recipient notification 180 shows the details generated by the email user interface 126 within a graphical user interface (GUI) for display on a display device 124, in order to notify a user a potential recipient exists. It should be noted that other embodiments of the potential recipient notification 180 may be integrated with existing or new interfaces that are used to display related information.

The illustrated potential recipient notification 180 includes a title bar 182, a potential recipient notification message body 184, add buttons 186, as well as group potential recipient notification control buttons 188. The title bar 182 shows a title of the potential recipient notification 180. The potential recipient notification message body 184 shows the details of the potential recipient notification, such as names of potential recipients associated with add buttons 186. The user that received the potential recipient notification can click one or more of the displayed add buttons 186 to add a recipient of the email. Additionally, the user can click on the control buttons 188 to accept any user selection or to cancel the potential recipient notification.

FIG. 6 depicts a schematic block diagram of one embodiment of a recipient rule 147 stored in the memory device 134 of FIG. 3. In particular, the recipient rule 147 depicts one embodiment of the details stored in the memory device 134 in regard to the associations between the parsed fields of an email and a list of potential recipients. It should be noted that other embodiments of the recipient rule 147 may be integrated with fewer or more fields in relation to a stored association.

The illustrated recipient rule 147 includes a title bar 190, a header row 192, and data rows 194. The title bar 190 depicts a title of the recipient rule 147. The header row 192 includes an email field column, a content column that includes parsed text associated with the field or fields indicated in the email field column, or content qualifiers, and a list of potential recipients associated with the content of the indicated email field. In some embodiments, the header row 192 includes fewer or more columns. As depicted, the data row 194 includes three data rows. In some embodiments, the data row 194 includes fewer or more data rows. The first data row associates a list of potential recipients, users A, B, C, and D, to an email that contains the text string "status report" in the subject field of the email. The second data row associates a supervisor Z to an email that contains the email address of a customer X in the address field as well as a detected angry tone in the text contained in the message body of the email. The third data row associates a list of potential recipients, users L, M, N, O, and P, to an email that contains the text string "this is funny" or "joke" in the subject field of the email. Hence, the semantic database 148 stores associations between a list of potential recipients and parsed text strings related to various fields of an email.

Figure 7:
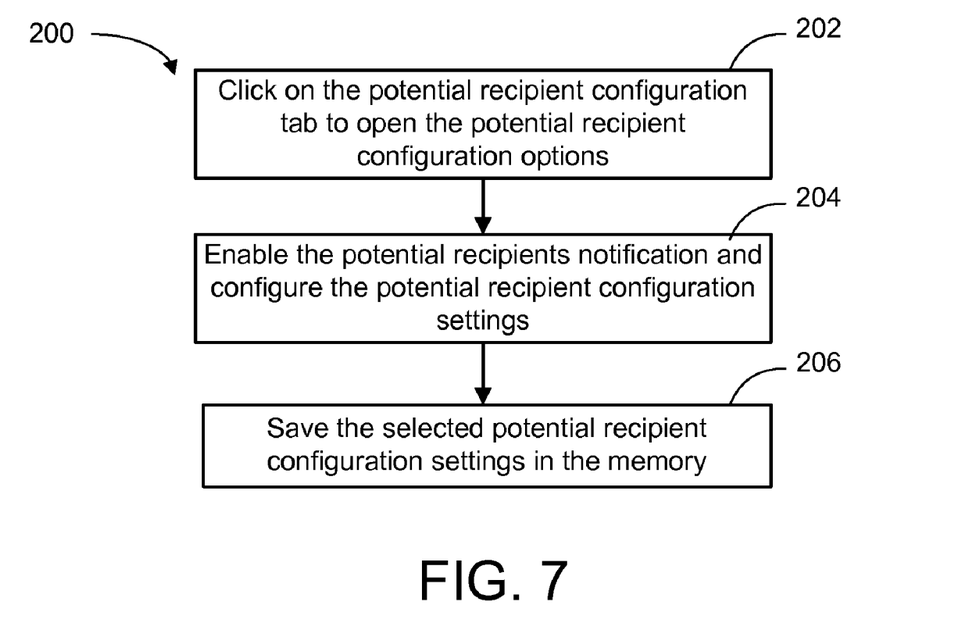
FIG. 7 depicts a schematic flow chart diagram of one embodiment of a method for configuring potential recipient settings.

FIG. 7 depicts a schematic flow chart diagram of one embodiment of a method 200 for configuring potential recipient settings. For ease of explanation, the configuration method 200 is described with reference to the PRA 132 of FIG. 3. However, some embodiments of the configuration method 200 may be implemented with other PRA. Additionally, the configuration method 200 is described in conjunction with the potential recipient configuration interface 144 of FIG. 4, but some embodiments of the method 200 may be implemented with other potential recipient configuration interfaces.

In the illustrated configuration method 200, at block 202, a user clicks on the potential recipient configuration tab from the email tab option 164, to display the potential recipient configuration interface 144 on the display device 124. From the potential recipient configuration interface 144, at block 204, in some embodiments, a user enables the potential recipient notification. Additionally, the user is allowed to configure the potential recipient configuration settings 146. In some embodiments, a user then clicks, at block 206, on the save option from the potential recipient configuration interface 144 to save the selected potential recipient configuration settings 146 in the memory device 134.

Figure 8:
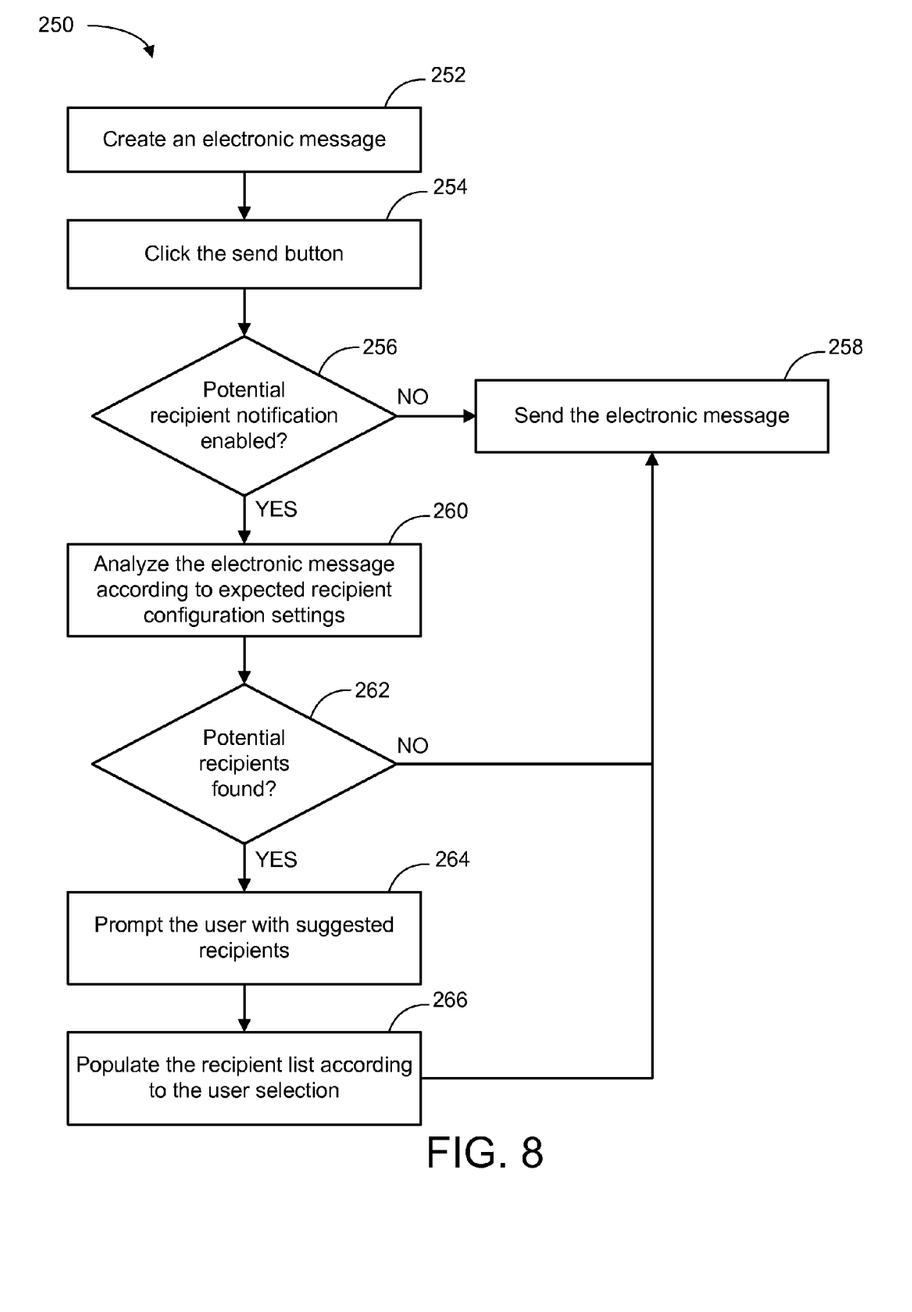
FIG. 8 depicts a schematic flow chart diagram of one embodiment of a method for implementing potential recipient notification functions.

FIG. 8 depicts a schematic flow chart diagram of one embodiment of a method for implementing potential recipient notification functions. For ease of explanation, the implementation method 250 is described with reference to the PRA 132 of FIG. 3. However, some embodiments of the implementation method 250 may be implemented with other PRA. Additionally, the implementation method 250 is described in conjunction with the potential recipient configuration interface 144 of FIG. 4, but some embodiments of the method 250 may be implemented with other potential recipient configuration interfaces.

In the illustrated implementation method 250, at block 252, a user creates an electronic message such as an electronic message. At block 254, the user clicks on a send button associated with the electronic message user interface 126 to send the electronic message. In some embodiments, at block 256, the email server 112 verifies whether potential recipient notification is enabled. If the email server 112 determines that potential recipient notification is not enabled, then at block 258 the email server 112 sends the electronic message to the recipients address in the address field of the electronic message. Otherwise, at block 260, the PRA 132 analyzes the electronic message according to the potential recipient configuration settings 146.

In some embodiments, the parser 136 parses the fields of the electronic message and the comparator 138 compares the parsed fields of the electronic message to the stored electronic message fields related to the potential recipient associations stored in the semantic database 148. At block 262, the trigger 142 then determines whether any potential recipients are discovered in the analysis of the parsed fields. For example, the trigger 142 may determine based on the parsed fields of the electronic message that at least one of the potential recipients is missing from the address field of the electronic message. If the trigger 142 determines that none of the potential recipients are missing, or that there were no matches to the text strings contained in the parsed fields of the electronic message, then the email server 112 sends the electronic message at block 258. Otherwise, at block 264, the trigger 142 prompts the user with the potential recipient notification 180 that contains suggested recipients missing from the address field of the electronic message but that are potential recipients based on the text strings contained in the fields of the email. At block 266, the trigger 142 populates the address field of the email with the suggested recipients according to the user's selection.

Figure 9:
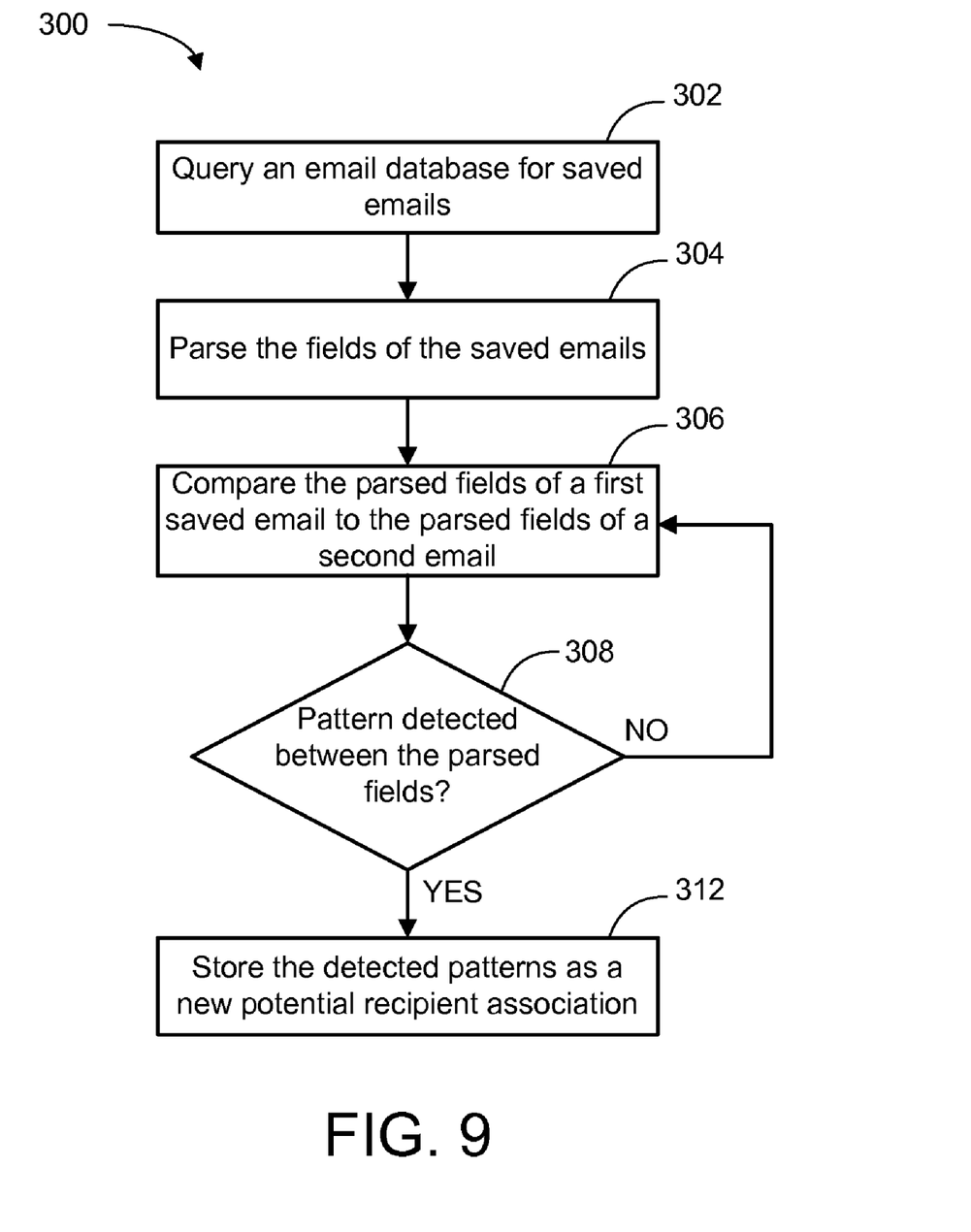
FIG. 9 depicts a schematic flow chart diagram of one embodiment of a method for dynamically creating potential recipient associations.

FIG. 9 depicts a schematic flow chart diagram of one embodiment of a method for dynamically creating potential recipient associations. For ease of explanation, the dynamic association method 300 is described with reference to the PRA 132 of FIG. 3. However, some embodiments of the dynamic association method 300 may be implemented with other PRA. Additionally, the configuration method 132 is described in conjunction with the potential recipient configuration interface 144 of FIG. 4, but some embodiments of the method 300 may be implemented with other potential recipient configuration interfaces.

In the illustrated dynamic association method 300, at block 302, the pattern detector 140 queries the email database 114 for saved emails. In some embodiments, at block 304, the parser 136 parses the fields of the saved emails queried from the email database 114. At block 306, the comparator 138 then compares the parsed fields of a first saved email to the parsed fields of a second saved email. At block 308, the pattern detector 140 determines whether a pattern exists between the parsed fields of the first and second saved emails and the recipients of the first and second saved emails. If the pattern detector 140 determines that no pattern exists between the first and second saved emails, then the dynamic association method 300 returns to block 306 where the comparator 138 selects another first and/or second saved email to compare against the other. Otherwise, at block 312, the pattern detector 142 stores a detected pattern as a new potential recipient association in the appended to the recipient rule 147 stored in the semantic database 148.

It should also be noted that at least some of the operations for the methods 200 and 300 may be implemented using software instructions stored on a computer useable storage medium for execution by a computer. As an example, an embodiment of a computer program product includes a computer useable storage medium to store a computer readable program that, when executed on a computer, causes the computer to perform operations. In one embodiment, the operations include an operation to receive content input for an electronic communication. The electronic communication includes at least one field of a plurality of fields. The plurality of fields includes a subject line, a message body, and a recipient address field. The at least one field of the electronic communication is populated with the content input. Further embodiments of the computer program product include an operation to parse the content input of the electronic communication. Further embodiments of the computer program product include an operation to semantically analyze the parsed content input of the at least one field of the electronic communication for a content qualifier of a recipient rule. Further embodiments of the computer program product include an operation to suggest a potential recipient of the electronic communication based on the content qualifier associated with the content input of the at least one field of the electronic communication.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable medium to store a computer readable program that, when executed on a computer, causes the computer to perform operations comprising:
   parse content input of a plurality of past electronic communications stored in an electronic communication database;
   identify a pattern between the parsed content input of a first of the plurality of past electronic communications and a second of the plurality of past electronic communications;
   generate a recipient rule based on the identified pattern between the first and the second of the plurality of past electronic communications;
   receive a save command from a user, wherein the save command is a command to save a user configuration of the recipient rule;
   store the recipient rule in a memory device;
   receive content input for an electronic communication, wherein the electronic communication comprises at least one field of a plurality of fields, the plurality of fields comprising a subject line, a message body, and a recipient address field, and wherein the at least one field of the electronic communication is populated with the content input;
   parse the content input of the at least one field of the electronic communication;
   semantically analyze the parsed content input of the at least one field of the electronic communication to identify a content qualifier of the recipient rule; and
   suggest a potential recipient of the electronic communication based on the content qualifier of the recipient rule associated with the content input of the at least one field of the electronic communication.

2. The computer program product of claim 1, wherein the computer readable program, when executed on the computer, causes the computer to perform further operations comprising:
   compare the parsed content input of the electronic communication with entries of a semantic database to determine a semantic meaning of at least a portion of the parsed content input, wherein the semantic database defines the recipient rule between the semantic meaning and the potential recipient; and
   identify an omission of the potential recipient from the recipient address field of the electronic communication.

3. The computer program product of claim 1, wherein the computer readable program, when executed on the computer, causes the computer to perform further operations comprising:
   compare the parsed content input of the electronic communication with a keyword, wherein the keyword is associated with the potential recipient;
   determine a match exists between the keyword and the content qualifier; and
   identify an omission of the potential recipient from the recipient address field of the electronic communication.

4. The computer program product of claim 1, wherein the computer readable program, when executed on the computer, causes the computer to perform further operations comprising:
   identify a tone of at least one word within the parsed content input of the electronic communication, wherein the tone is associated with the potential recipient; and
   identify an omission of the potential recipient from the recipient address field of the electronic communication.

5. The computer program product of claim 1, wherein the computer readable program, when executed on the computer, causes the computer to perform further operations comprising:
   recognize an identified recipient included in the recipient address field of the electronic communication, wherein the identified recipient is associated with the potential recipient; and
   identify an omission of the potential recipient from the recipient address field of the electronic communication.

6. The computer program product of claim 1, wherein the computer readable program, when executed on the computer, causes the computer to perform operations to add the potential recipient to the recipient address field of the electronic communication according to a selection of an email user.

7. The computer program product of claim 1, wherein the computer readable program, when executed on the computer, causes the computer to perform operations comprising:
   parse the content input of at least one field of a past electronic communication to identify a recipient addressing instruction; and
   store the recipient addressing instruction in a recipient address database.

8. The computer program product of claim 1, wherein the computer readable program, when executed on the computer, causes the computer to perform operations comprising:
   save a configured version of the recipient rule in the memory device in response to the save command.

9. An apparatus comprising:
   a receiver to receive content input for an electronic communication, wherein the electronic communication comprises at least one field of a plurality of fields, the plurality of fields comprising a subject line, a message body, and a recipient address field, and wherein the at least one of the plurality of fields of the electronic communication is populated with the content input;
   a parser coupled to the receiver, the parser to parse the content input of the at least one field of the electronic communication, wherein the parser is further configured to parse content input of a plurality of past electronic communications stored in an electronic communication database and further configured to identify a pattern between the parsed content input of a first of the plurality of past electronic communications and a second of the plurality of past electronic communications;
   a comparator coupled to the parser, the comparator to semantically analyze the parsed content input of the at least one field of the electronic communication to identify a content qualifier of a recipient rule;
a trigger coupled to the comparator, the trigger to suggest a potential recipient of the electronic communication based on the content qualifier of the recipient rule associated with the content input of the at least one of field of the electronic communication;
a pattern detector coupled to the parser and the comparator, the pattern detector to parse the content input of at least one field of a past electronic communication to identify a recipient addressing instruction and to store the recipient addressing instruction in a recipient address database, wherein the pattern detector is further configured to generate the recipient rule based on the identified pattern between the first and the second of the plurality of past electronic communications and to store the recipient rule in a memory device; and
a potential recipient configuration interface coupled to the memory device, the potential recipient configuration interface to receive a save command from a user, wherein the save command is a command to save a user configuration of the recipient rule.

10. The apparatus of claim 9, wherein the comparator is further configured to compare the parsed content input of the electronic communication with entries of a semantic database to determine a semantic meaning of at least a portion of the parsed content input, wherein the semantic database defines the recipient rule between the semantic meaning and the potential recipient.

11. The apparatus of claim 10, wherein the trigger is further configured to identify an omission of the potential recipient from the recipient address field of the electronic communication based on a match between the parsed content input of the electronic communication and the entries of the semantic database.

12. The apparatus of claim 9, the potential recipient configuration interface further configured to save a configured version of the recipient rule in the memory device in response to the save command.

13. A method comprising:
parse content input of a plurality of past electronic communications stored in an electronic communication database;
identify a pattern between the parsed content input of a first of the plurality of past electronic communications and a second of the plurality of past electronic communications;
generate a recipient rule based on the identified pattern between the first and the second of the plurality of past electronic communications;
receive a save command from a user, wherein the save command is a command to save a user configuration of the recipient rule;
store the recipient rule in a memory device;
receiving content input for an electronic communication, wherein the electronic communication comprises at least one field of a plurality of fields, the plurality of fields comprising a subject line, a message body, and a recipient address field, and wherein the at least one of the plurality of fields of the electronic communication is populated with the content input;
parsing the content input of the at least one field of the electronic communication;
semantically analyzing the parsed content input of the at least one field of the electronic communication to identify a content qualifier of the recipient rule; and
suggesting a potential recipient of the electronic communication based on the content qualifier of the recipient rule associated with the content input of the at least one field of the electronic communication.

14. The method of claim 13, further comprising:
comparing the parsed content input of the electronic communication with entries of a semantic database to determine a semantic meaning of at least a portion of the parsed content input, wherein the semantic database defines the recipient rule between the semantic meaning and the potential recipient;
identifying an omission of the potential recipient from the recipient address field of the electronic communication; and
adding the potential recipient to the recipient address field of the electronic communication according to a selection of an email user.

* * * * *